Figure 1:
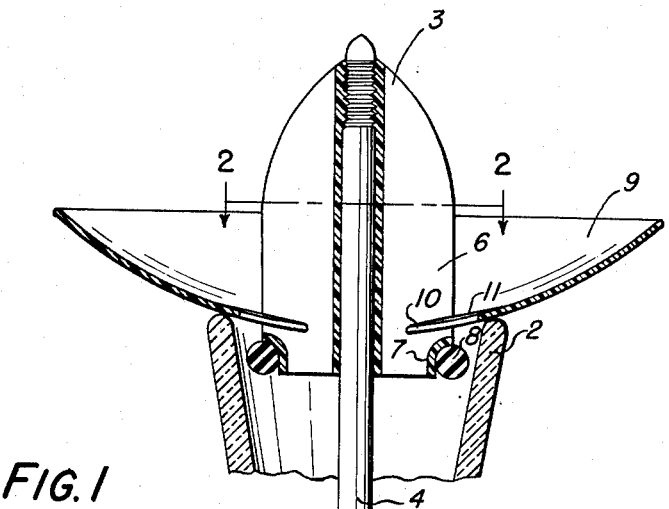

Dec. 30, 1952     F. R. HIGLEY     2,623,561
FRUIT JUICE EXTRACTOR

Filed Dec. 17, 1946     2 SHEETS—SHEET 1

INVENTOR,
Frank R. Higley

Dec. 30, 1952 F. R. HIGLEY 2,623,561
FRUIT JUICE EXTRACTOR
Filed Dec. 17, 1946 2 SHEETS—SHEET 2

INVENTOR,
Frank R. Higley

Patented Dec. 30, 1952

2,623,561

UNITED STATES PATENT OFFICE 2,623,561

FRUIT JUICE EXTRACTOR

Frank R. Higley, Cleveland Heights, Ohio

Application December 17, 1946, Serial No. 716,690

19 Claims. (Cl. 146—3)

This invention relates to fruit juice extractors, of the type employing a reamer, on which a half of a generally spherical fruit, such as an orange or other citrus fruit, is impaled for the extracting operation, which operation is effected by relative motion between fruit and reamer.

General objects of the present invention are to improve the reaming characteristics, to extract a higher percentage of juice to pulp more quickly and easily than heretofore; by simple apparatus of few parts inexpensively manufactured, operated by natural cyclic motion of the operator applied directly to the fruit itself, and easily cleaned after use.

The invention contemplates means for imparting a cycloidal progression of the reamer automatically resultant from such natural operator movement so that there is relative rotary motion between fruit and reamer, without relative rotary motion between the operator's hand and the fruit therein. Further, the progression is preferably of hypocycloidal characteristic so that the pulpy juice-containing cells of the fruit are macerated for extraction of their juice rather than scraped from the fruit, so that there is less pulp for subsequent removal by straining.

Other important objects of the invention are to provide much improved straining means, agitated by reamer operation to improve the straining effectiveness, simple stripping means for clearing the reamer of accumulated pulp and the like, and to combine straining and stripping means to provide a relative motion for the effect of a strainer which is live in operation, so that the straining is accelerated and the straining interstices may be of reduced size and concentrated area, and the device may be directly applied to a container or other receptacle of relatively small mouth.

Still another object of the invention is to provide that such receptacle for extracted and strained juice may serve, not only as the base for the apparatus and particularly for support of the reamer means, but is cooperative with the latter to effect the cycloidal motion thereof.

Such receptacle base, according to the invention, is also cooperative with the strainer means to produce the live effect to which reference has been made.

Since by this invention the strainer means may be of concentrated area, the receptacle may be a container, as another feature of the invention, formed with a small mouthed neck portion above and enlarged body portion providing shoulders nicely adapted to receive one hand of the operator for convenient securement of the apparatus while the other hand grasps the fruit applied to the reamer.

Figure 3:
Figure 2:
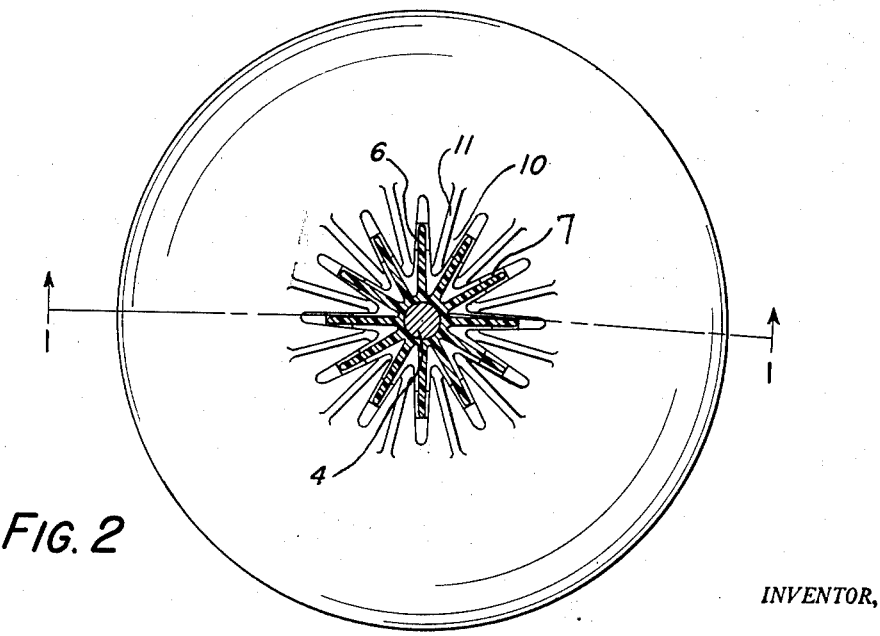

Further objects and advantages will be apparent from the following description taken in connection with the accompanying drawings, wherein Fig. 1 is a view generally in sectional elevation of a preferred embodiment of the invention, showing the parts in concentric relation, Fig. 2 being a plan view of the same, and Fig. 3 a side elevation thereof in reduced size.

Figure 4:
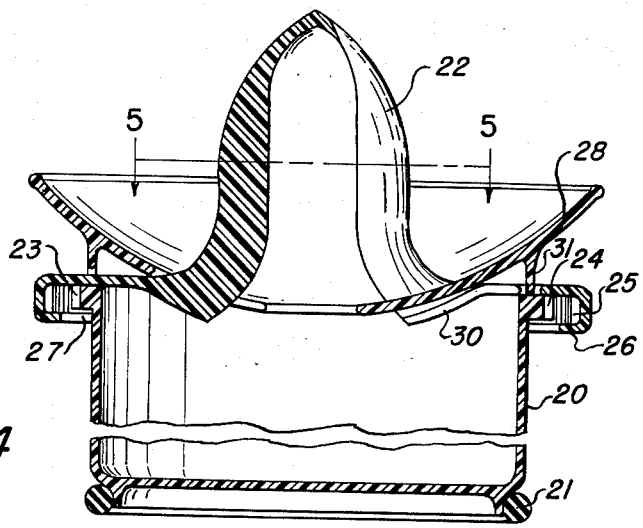
Figure 5:
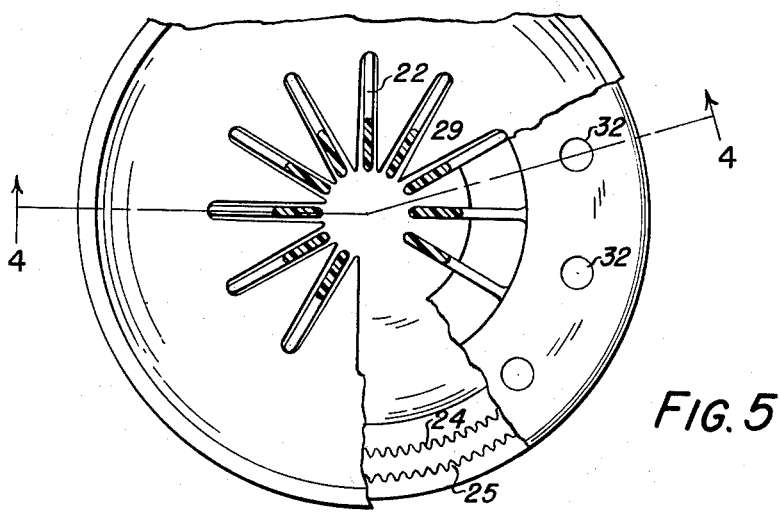

Figs. 4 and 5 illustrate another embodiment of the invention, Fig. 4 being a sectional elevation as in the planes of line 4—4 Fig. 5; Fig. 5 being generally a horizontal section as in the plane of line 5—5, Fig. 4 and other parts being broken away to show details of construction; the parts in Figs. 4 and 5 being shown in centered relation.

Figure 6:
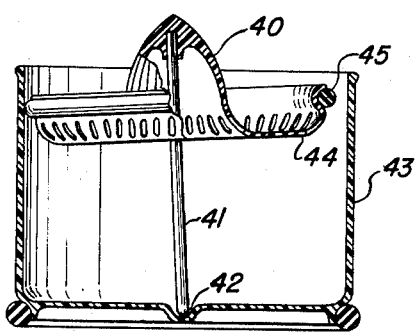

Fig. 6 is a sectional elevation of a third and simplified embodiment.

With reference now to the drawings and first to Figs. 1 to 3 thereof, 1 is a container of carafe form with a neck extending upwardly from an enlarged body portion and terminating in a receptacle mouth portion 2, and 3 indicates generally a reamer head.

For movable and removable support of the reamer head 3 from the container 1 as a base, the head is provided with a stem 4 in fixed relation to a central hub part and extending downwardly therefrom and into the container, to tiltably and rotatably seat in a central depression 5 at the bottom thereof.

For extraction of juice from fruit applied to the reamer, its head 3 is provided with deep thin radially spaced teeth 6 extending from the central hub part, longitudinally from the upper extremity of the reamer downwardly within the mouth 2 of the container, and there being interconnected by an annular member 7. Preferably, to provide means for driving engagement between the reamer head and the receptacle, a rubber ring 8 is provided, seating in the annular member 7 and having an outside diameter somewhat less than the inside diameter of the adjacent mouth part 2 of the container 1.

For preventing spillage about the mouth of the container, a concave apron part 9 is provided, which may preferably be arranged to rest on the mouth of the container for its support, and which is provided with prongs 10 extending between the reamer teeth 6 with a loose fit as indicated to provide straining interstices above the container mouth, and which extends peripherally and upwardly beyond the mouth.

Both the inside or upper, and outside or lower, faces of the apron part 9, are concentrically spherical as illustrated, the apron being generally in the form of a hollow spherical segment. As to the lower face of the part 9, since it bears upon a circular support, here shown as the rim of the container mouth 2, lateral motion of the apron part 9 will be effectively about the center of its sphericity. As to the upper or inner face of the apron member 9, it will be apparent that, because of its corresponding concentric sphericity, such lateral motion will the least disturb any liquid which it may hold.

In the example illustrated, the container 1 may be of glass, the reamer head 3 of molded plastic, its stem 4 of stainless steel, and the part 9 of molded plastic of a different color from that of the reamer head. Either or both the reamer head end and part 9 may be of composition providing them some flexibility, and with sufficient flexibility the ring 8 might be made integral with the reamer head.

It will be apparent that upon downward pressure accompanied by cranking motion, applied to the reamer head as by the hand of an operator nutational impaling fruit upon the head, the reamer means will have a cyclic motion about the lower extremity of its stem 4, the reamer tilting about an upright axis to accommodate this motion and the ring member 8 engaging the mouth portion 2 of the container progressively thereabout. Frictional or tractive effect between the member 8 and the container will cause cycloidal, and more particularly hypocycloidal progression or advancement motion of the reamer, at a low rate relative to the cranking rate and in a direction opposite the cranking direction. Moreover the motion is accompanied by a wobble of the reamer within the fruit which improves the reaming effectiveness.

Further, it is to be noted that, as between the fruit and the reamer, the effect is such that at the instant location of maximum lateral bearing between fruit and reamer, the reamer principally rolls within the fruit with macerating rather than scraping result.

To increase the tractive effect between the receptacle mouth and the reamer base, the interior of the mouth may be ground or otherwise roughened as to receive a ground glass stopper, or the cooperative parts might be toothed as will hereinafter appear so that the drive is positive instead of frictional.

Extracted juice finds its way downwardly and into the container by way of the interstices between the reamer teeth 6 and the prongs 10, so that a strainer effect is had and pulp and seeds are retained upon the apron part 9.

Still further, since the part 9 has independent support on the receptacle, it will have some movement including rotational advancement imparted to it by the reamer, yet it will also have lateral movement relative to the reamer. This relative movement, at the teeth 6 and prongs 10, produces a working effect at the interstices therebetween, so that the strainer has a live characteristic, with much faster straining capacity per unit of free area, than would otherwise be the case. The bases of the prongs 10 are so located that the straining interstices remain over the mouth of the receptacle notwithstanding such motion, so that there will be no spillage outside the receptacle. The part 9 is in the form of a spherical segment so that it will always have bearing upon and about the circular receptacle mouth.

Preferably the prongs 10 may be reinforced by ribs 11 which serve to engage the edge of the fruit rind when the impalement upon the reamer head is complete, so as to remove therefrom the last vestige of juice; and it will be noted that the working movement between the member 9 and the reamer head will enhance this operation.

After ultimate accumulation of seeds or pulp upon the apron 9 and between the teeth 6 of the reamer head, such accumulations are easily cleared, simply by lifting of the part 9 from the assembly, the prongs 10 in such operation moving upwardly along and between the teeth to strip the reamer, and receive and retain removed accumulations until dumped into the usual garbage container. When the part 9 is removed, the reamer will of course tilt from the vertical to rest against the mouth of the container.

Thus the apron part 9 has several functions. It collects extracted matter preventing spillage thereof and draining the juices to the described straining interstices at its prongs; cooperates with the reamer to provide such interstices, and thereafter serves as stripper to clear the reamer of solids such as seeds and pulp.

It may be noted that the prongs 10 at their extremities have approximate horizontal disposition so that they will not produce wedge effect in removing accumulations from the reamer; whereas radially thereabout, the cleaner has substantial slope, increasing outwardly, to accelerate drainage toward the straining interstices adjacent the prongs.

It will be apparent that after extraction, thorough washing of the separate reamer and cleaner parts is exceedingly easy, neither having any sharp concavities.

It is to be observed that the rate of cycloidal advance of the reamer in operation depends upon the pitch diameter relationship between the annular parts of reamer and container at the circle of bearing therebetween—namely, the effective pitch diameters of the ring 8 and mouth 2 thereabout.

It is also to be noted that owing to such diametrical difference the reamer assembly is in unstable equilibrium in operation, and a portion of downwardly impaling forces of fruit upon reamer are effective in part to provide lateral forces for traction at the cycloidal driving faces.

Thus in design, the rate of cycloidal progression may be controlled by diametrical considerations and its driving force component may be determined by the angle of mutation or tilt which in turn is dependent upon the relative elevation of the bearing of the bottom of the reamer stem in its socket.

Moreover, it is to be observed that the tilting which accompanies the cycloidal motion produces a wobble effect at the reamer head, which is highly effective upon the fruit being processed, so that the tilt is in nowise undesirable and is therefore not a limitation on design.

It will be apparent that the container form here illustrated is not essential to the invention, for example a drinking glass or set thereof could be employed instead, provided with bottom depression, and with suitably proportioned reamer parts, particularly as to diameter and as to length of supporting stem, extracted juice could be delivered directly into such glass.

With reference now to Figs. 4 and 5, the modification there illustrated differs from the form just described in several notable respects as will appear.

The base 20, which is also a container receptacle, is provided with a rubber bead 21 or the like to resist its movement upon the surface on which it rests.

The complementary reamer is provided with teeth 22 radially and longitudinally extending in annular arrangement, the teeth flaring outwardly adjacent the reamer base and being there interconnected by an annular flange 23 which rests upon the receptacle 20 and extends peripherally therebeyond. The reamer means is thus supported on the receptacle mouth for movement thereon in lateral directions.

For positive cycloidal drive of the reamer means, external teeth 24 are provided on the receptacle 20 about its mouth, and internal teeth 25 are provided on the flange 23 in the dependent cooperative location indicated Fig. 4; the pitch diameter of the teeth 24 being somewhat less than that of the teeth 25.

It will be apparent that by this arrangement cranking motion applied to the reamer head as by the hand of an operator through the fruit, will cause progressive cycloidal advance of the reamer at a substantially lower rate than the cranking rate. It is notable, however, that a characteristic of the reamer advance in this case is epicycloidal rather than hypocycloidal as before, so that cranking of the reamer in one direction will now cause its advance in the same direction.

To prevent tilting of the reamer during its operation, a flange 26 is provided as an extremity of the flange 23 of the reamer, engageable with a flange 27 on the receptacle 20 at the base of its teeth 24. In Figs. 4 and 5 the parts are shown in concentric relation, wherein upward removal of the reamer assembly is permitted; but it will be appreciated that in the cranking operation the teeth 24 and 25 and the flanges 26 and 27 will always be interengaged at one peripheral location.

For the straining, apron and stripping functions generally as before described, a part 28 is provided having prongs 29 extending between the reamer teeth 22 and thereabout an apron portion overhanging, the bases of the prongs 29 being located to clear the teeth 22 and generally above and within a sloping inner portion 30 of the flange 23 by which the reamer teeth have interconnection. The slope of the flange part 30 provides funnel effect for drainage into the receptacle 20 and also permits a lower location of the part 28 than would otherwise be possible.

For support of the part 28 upon the receptacle independent of the reamer, but for movement by the reamer to produce the live straining effect already described, the part 28 is provided with legs 31 which extend through clearance openings 32 provided in the flange 23 and resting upon the receptacle mouth adjacent the teeth 24.

With reference now to Fig. 6, a simplified modification is illustrated. Here the reamer means 40 has a supporting stem 41 having central bearing at 42 in the wide mouth receptacle 43. An annular perforate strainer apron 44 is provided integral with the reamer head. Means such as a rubber bead 45 is provided about the periphery of the apron 44 for driving engagement interior of the mouth of the container 43—or if preferred the apron 44 might be externally toothed at its periphery and corresponding teeth provided within the container mouth.

At any rate, it will be apparent that the general mode of operation will be as described in connection with modification of Figs. 1 to 3—cranking forces applied to the reamer by the fruit, producing hypocycloidal reamer advance in the opposite direction. The strainer effect is here without live characteristic, but nevertheless is assisted by the motion of the reamer in operation, agitating the contents of the annular strainer trough.

It may be observed that the cycloidal motion of the reamer in the second and third forms of the device herein disclosed is more particularly of prolate character, the pitch circle of the cycloidal drive being of greater diameter than the reamer head. This is not undesirable, as it provides a mechanical advantage to the cycloidal drive not obtainable where the reamer and pitch diameters are approximately equal, as in its first herein disclosed form, that of Figs. 1 to 3. Where reamer and pitch diameters are approximately equal, in operation the reamer will principally roll within the fruit, rather than have scraping action therein, so that juice will be squeezed out with less pulp removal than otherwise, but nevertheless the reamer will have some progression about the fruit.

It may also be observed, owing to the reamer progression provided in all forms of the device, the reamer may be of very substantially smaller diameter than that of the fruit, and in fact might be of substantially smaller diameter than those illustrated in the drawings herein. Obviously the smaller the reamer diameter, the easier to impale the fruit.

In all forms of the device, complete juice removal may be had without changing the position of the fruit relative to the operator's hand, and independently of non-circular nature of bearing between the fruit and hand, since in operation the bearing between fruit and reamer progresses around within the fruit. Also, in all forms of the device, the base on which the reamer is mounted, includes a mouth through which the principal axis of reamer movement extends, and which has associated parts cooperative with a reamer part to both limit the reamer movement from such axis and to impart cycloidal characteristic to the reamer as it moves about the axis.

What I claim is:

1. In a device of the class described and including complementary reamer and base means, said base means having a receptacle mouth and said means having parts cooperative for support of said reamer means adjacent said mouth for movement about an axis extending therethrough; means secured with said reamer means and engageable with the rim of said mouth to limit and impart cycloidal characteristic to said reamer means movement.

2. In a device of the class described and including complementary reamer and base means, said base means having a receptacle mouth and said means having parts cooperative for support of said reamer means adjacent said mouth for movement about an axis extending therethrough; means secured with said reamer means and engageable within the rim of said mouth to limit and impart hypocycloidal characteristic to said reamer means movement.

3. In a device of the class described and including complementary reamer and base means, said base means having a circular receptacle mouth, and parts cooperative to support said reamer means for cranking movement adjacent said mouth about an axis extending therethrough; means secured with said reamer means and engageable with the rim of said mouth to impart cycloidal characteristic to said reamer cranking movement.

4. In a device of the class described and including complementary reamer and base means, said base means having a circular receptacle mouth, and parts cooperative to support said reamer means for cranking movement adjacent said mouth about an axis extending therethrough; means secured with said reamer means and engageable within the rim of said mouth to impart hypocycloidal characteristic to said reamer cranking movement.

5. In a device of the class described and including complementary reamer and base means, said base means having a circular receptacle mouth; a part extending through said mouth into said receptacle means to bear upon the bottom thereof for support of said reamer means for tilting movement adjacent said mouth about an axis extending therethrough, said reamer means having a member engageable with the rim of said mouth to impart cycloidal characteristic to said reamer movement upon cranking forces applied thereto.

6. In a device of the class described and including complementary reamer and base means, said base means having a circular receptacle mouth; a part connected to said reamer means and extending through said mouth into said receptacle means to bear upon the bottom thereof for support of said reamer means for tilting movement adjacent said mouth about an axis extending therethrough, and a member secured with said reamer means and engageable within the rim of said mouth to impart hypocycloidal characteristic to said reamer movement upon cranking forces applied thereto.

7. Complementary reamer and base means, said base means having an upwardly opening mouth, said reamer means having a portion resting on the rim of said mouth for support of said reamer means while permitting lateral motion, and a portion laterally engageable with said rim for limiting and imparting cycloidal characteristic to motion of said reamer means upon application of cranking forces applied thereto.

8. Complementary reamer and base means, said base means having a receptacle mouth and said reamer means having a stem part extending through said mouth to the bottom of said base means for crankable support of said reamer means adjacent said mouth, said bottom having means for centering location of the extremity of said stem part, and said reamer and base means having parts adjacent said mouth interengageable to impart cycloidal progression to said reamer means when cranked.

9. In a device of the class described, upright reamer means mounted for cycloidal motion and having longitudinally extending teeth, a cleaner member having prongs extending between said teeth adjacent the reamer base and withdrawable upwardly from said reamer to remove accumulations from reamer operation, said teeth and prongs having loose fit to provide drainage therebetween, and receptacle means arranged to receive reamed products of said reamer means and to provide independent support of said reamer means and said cleaner member.

10. In a device of the class described upright reamer means having longitudinally extending teeth, a cleaner member having prongs extending between said teeth adjacent the reamer base and withdrawable upwardly from said reamer to remove accumulations from reamer operation, said teeth and prongs having loose fit to provide drainage therebetween, receptacle means, said reamer means and said receptacle means having parts cooperative for support of said reamer means for cycloidal reaming movement on said receptacle means, and said cleaner member and said receptacle means having parts cooperative for support of said cleaner member for movement responsive to said reamer means movement.

11. In a device of the class described, toothed reamer means mounted for cycloidal motion responsive to cranking motion of fruit impaled thereon and cleaner means having prongs extending between the reamer teeth and being withdrawable upwardly from said reamer to remove solid accumulations therefrom, said prongs fitting loosely between said teeth to provide drainage clearances therebetween, and means for supporting said cleaner means independently of said reamer means, for motion responsive to engagement by said reamer prongs.

12. In a device of the class described, toothed reamer means mounted on receptacle means having a mouth portion, for cycloidal motion responsive to cranking motion of impaled fruit in one hand of an operator, and cleaner means having prongs extending between the reamer teeth and being withdrawable upwardly from said reamer to remove reamed solid accumulations therefrom, said cleaner means being supported on said receptacle means mouth portion and having a sloping apron portion overhanging therebeyond, to receive reamed products from said fruit, and provide drainage thereof into the receptacle mouth, by way of the interstices between said prongs and the reamer teeth.

13. In a device of the class described, deeply toothed reamer means mounted for cycloidal motion responsive to cranking motion of fruit impaled thereon, and cleaner means having prongs extending deeply between the reamer teeth and being withdrawable upwardly from said reamer to remove solid accumulations therefrom, said cleaner means having an apron portion substantially overhanging beyond the periphery of said reamer means, said prongs fitting loosely between said teeth to provide drainage clearances therebetween adjacent the reamer axis, and means for supporting said cleaner means independently of said reamer means, said cleaner means apron portion having substantial slope to provide drainage toward said clearances and said prongs terminating without substantial slope, to improve accumulation removal thereby.

14. In a device of the class described and including complementary reamer and receptacle means, said receptacle means having a mouth and said means having parts cooperative for movable support of said reamer means adjacent said mouth about an axis extending therethrough: driving means secured with said reamer means and engageable with the rim of said mouth to impart cycloidal characteristic to said reamer means, the pitch diameter of said driving means approximating the diameter of said reamer means.

15. In a device of the class described, toothed reamer means, means mounting said reamer means for cycloidal motion about an upright axis responsive to cranking motion of fruit impaled thereon, apron means having prongs extending between the reamer teeth for cooperation therewith to provide drainage interstices, annular means arranged concentrically of said axis for support of said apron means independent of said reamer means, said apron means being generally in the form of a hollow spherical segment.

16. In a device of the class described, reamer means having head and stem portions, base means having a portion arranged to receive and position the stem portion of said reamer means for reamer means support while permitting tilting cranking operation of said reamer means, said reamer and base means having portions interengageable for limiting the angularity of said reamer means upon said base means and providing cycloidal drive for said reamer means responsive to said cranking operation.

17. In a device of the class described and including, reamer means and strainer means rigidly associated therewith and disposed thereabout to receive products thereof: receptacle means having a mouth disposed about said strainer means, said reamer means having a spindle bearing in said receptacle means, downwardly against the bottom thereof, to provide tiltable support of said reamer and strainer means.

18. In a device of the class described: complementary relatively movable and stationary means, said stationary means including annular means, said movable means having a reamer head and including circular means loosely disposed within said annular means, said annular means and circular means including portions interengageable to limit the radius of cyclic motion and impart cycloidal characteristic thereto responsive to cranking forces applied to said reamer head.

19. In a device of the class described: complementary relatively movable and stationary means, said stationary means including annular means, said movable means having a reamer head and including circular means loosely disposed within said annular means, said complementary means having cooperative bearing parts providing a nutational center for said movable means coaxial with said annular means and with said circular means, said annular and circular means including portions interengageable to limit the angle of nutational cyclic motion and impart cycloidal characteristic thereto responsive to cranking forces applied to said reamer head.

FRANK R. HIGLEY.

REFERENCES CITED

The following references are of record in the file of this patent:

UNITED STATES PATENTS

| Number | Name | Date |
|---|---|---|
| D. 89,232 | Young | Feb. 7, 1933 |
| 325,099 | Manny | Aug. 25, 1885 |
| 349,123 | Roth | Sept. 14, 1886 |
| 422,356 | Smith | Feb. 25, 1890 |
| 465,244 | Curley | Dec. 15, 1891 |
| 710,804 | Riel | Oct. 7, 1902 |
| 761,317 | McCall | May 31, 1904 |
| 945,806 | Rhodes | Jan. 11, 1910 |
| 951,241 | Hampel | Mar. 8, 1910 |
| 1,040,582 | Royer et al. | Oct. 8, 1912 |
| 1,747,641 | Morris | Feb. 18, 1930 |
| 1,794,504 | Van Norman | Mar. 3, 1931 |
| 2,017,960 | Faulds | Oct. 22, 1935 |
| 2,024,917 | Franze | Dec. 17, 1935 |
| 2,088,815 | Scott | Aug. 3, 1937 |
| 2,249,817 | Fromm | July 22, 1941 |
| 2,311,565 | Nelson | Feb. 16, 1943 |
| 2,404,382 | Klein | July 23, 1946 |

FOREIGN PATENTS

| Number | Country | Date |
|---|---|---|
| 29,618 | Germany | Dec. 1, 1884 |
| 185,071 | Germany | May 16, 1907 |